US007397912B2

(12) United States Patent
Aasman et al.

(10) Patent No.: US 7,397,912 B2
(45) Date of Patent: Jul. 8, 2008

(54) COMMUNICATION SYSTEM EMPLOYING A PERSONAL ASSISTANT SERVER AND A PERSONAL ASSISTANT TERMINAL

(75) Inventors: Jannes Aasman, Leiden (NL); Johannes Jan Kardol, Delft (NL); Robertus Johannes Nicolaas Kalberg, Zoetermeer (NL)

(73) Assignee: Koninklijke KPN N.V., The Hague (NL)

( * ) Notice: Subject to any disclaimer, the term of this patent is extended or adjusted under 35 U.S.C. 154(b) by 1054 days.

(21) Appl. No.: 10/275,492

(22) PCT Filed: May 11, 2001

(86) PCT No.: PCT/EP01/05482

§ 371 (c)(1),
(2), (4) Date: Jun. 17, 2003

(87) PCT Pub. No.: WO01/86928

PCT Pub. Date: Nov. 15, 2001

(65) Prior Publication Data

US 2004/0030751 A1    Feb. 12, 2004

(30) Foreign Application Priority Data

May 12, 2000    (NL) .................................. 1015165

(51) Int. Cl.
*H04M 3/06* (2006.01)
(52) U.S. Cl. .................. 379/266.03; 455/417; 709/206; 379/88.16
(58) Field of Classification Search .............. 379/88.16, 379/265.02, 266.03; 709/206, 217; 455/417
See application file for complete search history.

(56) References Cited

U.S. PATENT DOCUMENTS 5,574,784 A * 11/1996 LaPadula et al. ....... 379/265.02

(Continued)

FOREIGN PATENT DOCUMENTS

EP        0 026 165        4/1981

(Continued)

OTHER PUBLICATIONS

R.L. Bennett et al, "5ESSTM Switch ISDN Services", IEEE International Switching Symposium, Mar. 15-20, 1987, Phoenix, Arizona, pp. 343-351.

(Continued)

*Primary Examiner*—Gerald Gauthier
(74) *Attorney, Agent, or Firm*—Michaelson & Associates; Peter L. Michaelson

(57) ABSTRACT

A communication system has a plurality of user terminals, operable by a corresponding pourality of users, connecting means, a "personal assistant" server and a "personal assistant" terminal. The "personal assistant" terminal is connected to the "personal assistant" server and operated by a human "personal assistant". Any of the users, using his(her) user terminal, can contact (call) the human assistant, via the personal assistant terminal, to obtain information and/or other services. The server is connected to a user database which contains user data for all the users, with that data containing user-specific data and settings. The server, on detecting a call from any one of the user terminals to the personal assistant terminal, accesses the user data form the database and associated with the calling user. That data is provided to the personal assistant terminal. The server is also connected to a data system which is accessible and operable through the "personal assistant" terminal and responds to the accessed user data. The data system can be e-mail system, a diary system, an information systems, an SMS system, a fax system, a unified messaging system, etc.

12 Claims, 1 Drawing Sheet

U.S. PATENT DOCUMENTS 6,810,243 B2 * 10/2004 Torabi .................. 455/417

FOREIGN PATENT DOCUMENTS

WO        WO 96/11542        4/1996

OTHER PUBLICATIONS

Jud et al, "A Modern Integrated PABX With Centralized Message Recoding and Remote Distribution" IEEE National Telecommunications Conference, Nov. 29-Dec. 3, 1981, New Orleans, Louisiana, pp. F3.3.1-F3.3.4.

J.W. Timko, "AT&T Systems Architecture", AT&T Technology, 1987, pp. 4-13.

* cited by examiner

COMMUNICATION SYSTEM EMPLOYING A PERSONAL ASSISTANT SERVER AND A PERSONAL ASSISTANT TERMINAL

BACKGROUND OF THE INVENTION

1. Field of The Invention

The invention relates to a communication system comprising user terminals operable by users and connecting means for connecting the user terminals to a telecommunications network. The user terminals referred to below can include voice terminals.

DESCRIPTION OF THE PRIOR ART

A communication system of this kind is generally known as a private or public telephony system. The object of the present invention is to provide a system by which personified and personal assistance is offered to a user, which in fact amounts to a personal secretary function and which is intended especially for business and small-business use and is particularly well suited for teleworking "communities", etc. In contrast with a number of known systems, the present system does not, in principle, make use of "voice response" or "voice recognition" etc., but uses a human "personal assistant" or "operator" with sufficient resources at his or her disposal to offer very efficient personal help to a variety of users.

SUMMARY OF THE INVENTION

The communication system according to the invention comprises a "personal assistant" server connected to the connecting means, to which server a "personal assistant" terminal is connected, which can comprise a voice part and a data part and which can be operated by a human "personal assistant" who can be called up by the users via the connecting means. The "personal assistant" server, together with the personal "operator" who makes use of the facilities of the server, is part of the system.

In order to have all relevant data "on hand" when a user calls, the server is connected to a users database containing data about the various users, whereby the server, on detection of a call from a user voice terminal to the voice part of the "personal assistant" terminal, reads out the data of the calling user from the database and makes these data available to the data part of the "personal assistant" terminal. This enables the "operator" to see on the screen which user is calling as well as the user's relevant personal data. With the aid of these data, the operator can perform actions on behalf of the calling user, such as reading the user's e-mail etc., making use of the user-specific data and settings withdrawn from the database, namely the "username", "password" and "preferences", which are not shown on the screen but are used "underwater" for activating the user's e-mail account etc. (without the operator being able to read the username or—in particular—the password). Examples of this will be given in the working example. The users database can be connected via the connecting means to user data terminals, thus enabling the users themselves to read or modify their data.

As mentioned above, a particular object of the present invention is the support by means of the "personal assistant" server of the "personal assistant" in voice communication between the (voice) terminal of the user and the voice part of the terminal of the "personal assistant". The invention is not, however, as mentioned above, limited to this. The "personal assistant" server can also, by providing the "personal assistant" with specific user data and making user-specific settings, offer assistance and support when the communication between the user and the "personal assistant" proceeds via their (alphanumeric or graphic) data terminals. For such data communication as well, the "personal assistant" server can read out the user-specific data and settings from the database with reference to the address of the "calling" data terminal of the user.

As well as having access to the personal user's data, the "operator" can also be connected by means of his/her terminal and the "personal assistant" server to internal or external data systems (or "data-processing systems"), which can be operated by means of the "personal assistant" terminal. In many cases, depending on the sort of data system, the data system is operable by the "personal assistant" with (co—) control by user data of the calling user called up by the server from the users database. The data system may, for example, be an e-mail system; it is clear that the "personal assistant"—for example in reply to a query by the user to the "personal assistant": "Is there any mail for me?"—can only access that e-mail system by using user data (from the users database) such as login name and password of the user in question. The data system can also be a (personal) diary system (often integrated with the e-mail system) or an information system, for example a public transport information system that is consulted by the "personal assistant" at the user's request ("When is my appointment with Mr. P?" or "When does the first train leave for G?"). Other possibilities are an SMS system, a fax system ("Are there any faxes for me" or a "unified messaging" system ("Have any important messages arrived?"). Incidentally, it is also envisaged that the "personal assistant" can also —at the request of the user —send messages (e-mail, fax, SMS) or make appointments and enter them in the user's diary, etc. ("Miss A., please send an SMS message to X. to say I will be taking a later train.").

DETAILED DESCRIPTION

Figure 1:
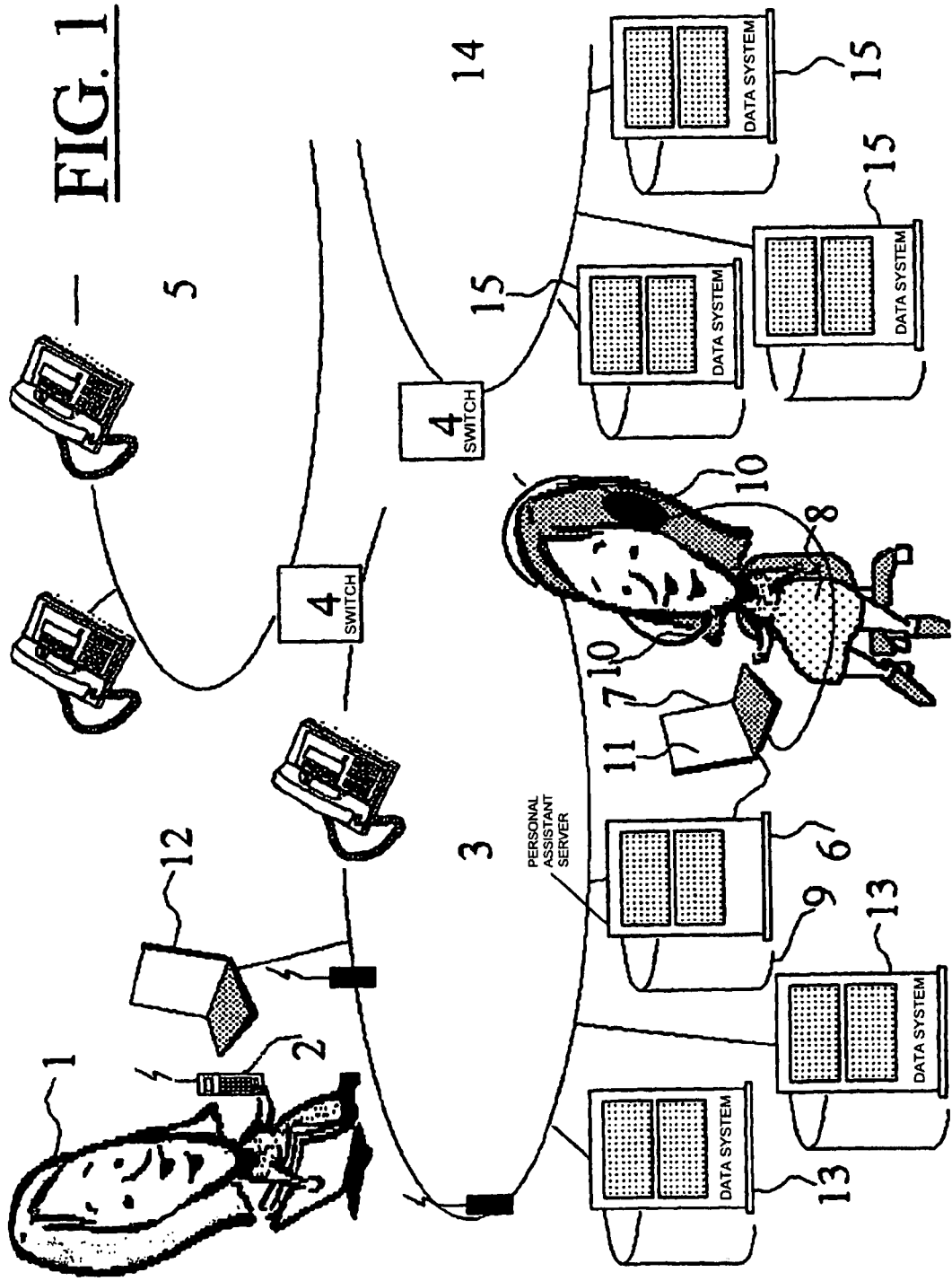
FIG. 1 shows a communication system that embodies the teachings of the present invention.

The invention will now be described in more detail with reference to a working example.

FIG. 1 shows a communication system comprising user voice terminals 2 operable by users 1 and connecting means, namely a network 3. Via a switch 4 the user voice terminals can be connected to a telecommunications network 5. Via another switch 4 the network 3 can be connected to a (for example IP based) data network 14. As well as the user voice terminals 2, the network 3 has connected to it, amongst other things, a "personal assistant" server 6, which is connected to a "personal assistant" terminal 7.

This terminal 7 comprises a voice part 10 and a data part 11 and can be operated by a human "personal assistant" (or "operator") 8 who can be called up by the users via the connecting means 3 and also vice versa. The "personal assistant" can also forward telephone calls to telephone sets etc. connected to the network 5.

The server 6 is connected to a users database 9 containing data about the various users 1. When a call from a user voice terminal 2 to the voice part 10 of the "personal assistant" terminal 7 is detected, the server reads the data of the calling user from the database and sends it to the data part 11 of the "personal assistant" terminal 7.

The users database 9 is also connected via the connecting means 3 to user data terminals 12, enabling the users 1 to read or modify their data.

The server 6 is additionally connected to various internal data systems 13 and/or —via a network 14 —to external data systems 15, which are accessible and operable by the "personal assistant" 8 by means of the "personal assistant" terminal 7. These data systems 13 and 15 are operable by the "personal assistant" 8 by means of the "personal assistant" terminal 7 with control by user data (data, settings, parameters) of the calling user 1 called up by the server 6 from the users database 9. The data system can be an internal (or external) e-mail system, a diary system, an information system, for example an (external) Internet-based system or an (internal) intranet-based system. The data system can also be a Short Message System (SMS), a fax system or a unified messaging system.

If user 1 calls the "personal assistant" 8 (or more accurately server 6) via telephone set 2 and network 3, the extension number of user 1 is forwarded to the "personal assistant" server 6. On the basis of this extension number ("CLI"), server 6 searches in its database 9 for the personal data and settings of the user and reads these out. Some of these personal data —such as the name of the caller —are sent to screen 11 of the "personal assistant" terminal 7, while a call signal sounds in the voice part 10. The "personal assistant" 8 can now answer the call in a personal manner ("Good afternoon, <user name>, how can I help you?") with the aid of the data (such as the user name) displayed on the screen 11. The user 1 can now ask questions or make requests which can be handled by the assistant with the aid of the personal user data and settings from the user database 9. For example, the e-mail address of the user is stored in the database 9 and will be read out from the database 9 in the event of a call by the user. The user 1 can now ask the question "Is there mail for me?", to which the assistant, with the aid of the user's e-mail address —that does not need to be displayed on the screen 11, can call up the e-mail of the user with a few simple actions and answer the question. Similarly, the user can ask the question "How are my shares doing?", which the assistant can answer simply and quickly if the user's share funds are stored in the personal data and can be read out in response to a call. Controlled by the read-out funds, an internal or external data system 13 or 15 respectively, which can provide the requested share prices, is consulted. Another example is the request by user 1 for the assistant to phone "home" to say that the user 1 will be coming home later. In this case, the "home" telephone number is read from the database 9 and either displayed on the screen 11 and used by the assistant for dialing, or incorporated as (invisible) attribute in a screen object ("Home telephone") that can be activated by the screen mouse in order to dial the "home" telephone number and then to switch through to the user 1. The user can also ask the "operator" to make an appointment with another person, either by phone or via a shared diary system (e.g., implemented via data system 13 or 15). For this as well, the "operator" needs the access codes etc. for the diary system, which are read out from the database 9. After being made, appointments are entered in the diary system possibly after consultation with the user 1 via the voice part 10.

The users database 9 can, via the connecting means 3, be accessed and modified by the users 1. To enable the assistant to provide the user with data from various types of data systems, the server 6 is connected to various internal data systems 13 and/or external data systems 15, which can be operated by the assistant 8, making use of user data of the calling user 1 called up by the server 6 from the users database 9. The data system can, as already mentioned, be an internal or external e-mail or diary system, an information system based on, for example, the Internet or intranet, a Short Message System (SMS), a fax system or a unified messaging system.

In this way, the personal "operator" can, with the aid of server 6 and servers 13 and 15 operable from server 6, offer a wide range of services to each user 1 individually in an efficient but nevertheless personal (non-mechanical) manner.

It is pointed that the system according to the invention is based on the deployment of a human "operator" who, with the support of server 6 and servers 13 and 15, answers the users and serves them by setting up telephone connections to the network 5, obtaining information and/or performing tasks, making appointments, sending messages, etc. Although the system makes use of a human "operator", it is nevertheless envisaged that some tasks could be taken over by an "electronic operator", via "voice recognition" and "voice response" (VR), etc. For this purpose it is envisaged that the server 6 could comprise modules which record actual dialogues held between the users and the human "operator" and, based on this input, could be developed and trained to respond to data for VR.

Although the main aim of the present invention is to improve voice-based communication between the "personal assistant" 8 and the users 1, the invention is also useful if the communication is based on data. The "personal assistant" server 6 can, by offering the "personal assistant" specific user data and making user-specific settings, also provide assistance and support if the communication between the user and the "personal assistant" proceeds via their (alphanumeric or graphic) data terminals 11 or 12 respectively. For such data communication as well, the "personal assistant" server can read out from the database 9 the user-specific data and settings based on the address of the "calling" data terminal 12 of the user and use them in the further interaction with the user.

We claim:

1. A communication system comprising:
    a plurality of user terminals operable by a corresponding plurality of users, the user terminals being connected to a telecommunications network;
    a "personal assistant" server connected to the network and capable of accessing a user database containing user-specific data or settings of the users so as to define user data;
    a "personal assistant" terminal connected to the personal assistant server and operable by a human attendant who can be communicatively reached, via the personal assistant terminal, by any of the users through a corresponding one of the user terminals and the network; and
    a data system, connected to the network and operative in response to the personal assistant terminal, for providing a pre-defined service, through one of the user terminals, to a corresponding calling one of the users who then requests the service; and
    wherein the personal assistant server, in response to an incoming call originating from the calling one of users and through said one user terminal and the network and to the personal assistant terminal, accesses, from the user database, the user data associated with the calling one user and applies the user data so accessed to the personal assistant terminal and connects, through the personal assistant terminal, the calling one user with the attendant such that, upon suitable instruction from the attendant through the personal assistant terminal and issued in response to a request from the calling one user for the service, the personal assistant server sends the accessed user data to the data system and the data system then renders the requested service to the calling user in response to the accessed user data.

2. The communication system recited in claim 1 wherein the data system comprises an e-mail system operable by the personal assistant terminal and responsive to the accessed user data.

3. The communication system recited in claim 1 wherein the data system comprises an electronic diary operable by the personal assistant terminal and responsive to the accessed user data.

4. The communication system recited in claim 1 wherein the data system comprises an information system operable by the personal assistant terminal and responsive to the accessed user data.

5. The communication system recited in claim 1 wherein the data system comprises an SMS system operable by the personal assistant terminal and responsive to the accessed user data.

6. The communication system recited in claim 1 wherein the data system comprises a fax system operable by the personal assistant terminal and responsive to the accessed user data.

7. The communication system recited in claim 1 wherein the data system comprises a unified messaging system operable by the personal assistant terminal and responsive to the accessed user data.

8. The personal assistant server for use in the communication system recited in claim 1.

9. The communication system recited in claim 1 wherein the user database is also connected, via the network, to the user terminals such that any given one of the users can read or modify the user data associated with said given one user.

10. The communication system recited in claim 1 wherein each of the user terminals comprises a voice terminal, and the personal assistant terminal comprises a voice part and a data part, and wherein the personal assistant server, as a result of detecting the incoming call from the one user terminal, provides the accessed user data to the data part of the "personal assistant" terminal.

11. A personal assistant server for use in a telecommunications system, the telecommunications system having a plurality of user terminals operable by a corresponding plurality of users and connected to a telecommunications network, a "personal assistant" terminal being operable by a human attendant who can be communicatively reached, via the personal assistant terminal and the network, by any of the users through a corresponding one of the user terminals and the network, and a data system, connected to the network and operative in response to the personal assistant terminal, for providing a pre-defined service, through one of the user terminals, to a corresponding calling one of the users who then requests the service, the personal assistant server comprising:
   means for communicatively coupling the server to both the network and the personal assistant terminal; and
   means for communicatively coupling the server to a user database containing user-specific data or settings of the users so as to define user data; and
   wherein the server, in response to an incoming call originating from the calling one of users and through said one user terminal and the network and to the personal assistant terminal, accesses, from the user database, the user data associated with the calling one user and applies the user data so accessed to the personal assistant terminal and connects, through the personal assistant terminal, the calling one user with the attendant such that, upon suitable instruction from the attendant through the personal assistant terminal and issued in response to a request from the calling one user for the service, the personal assistant server sends the accessed user data to the data system and instructs the data system to then render the requested service to the calling user in response to the accessed user data.

12. The server recited in claim 11 wherein each of the user terminals comprises a voice terminal and the personal assistant terminal comprises a voice part, and the server further comprises means for recording and processing actual dialogues between the voice part of the personal assistant terminal and the voice terminal used by the calling one user.

\* \* \* \* \*